Patented May 20, 1941

UNITED STATES PATENT OFFICE 2,242,224

SURFACE WETTING AGENT AND PROCESS OF MAKING IT

Rudolph S. Bley, Elizabethton, Tenn., assignor to North American Rayon Corporation, New York, N. Y., a corporation of Delaware No Drawing. Application November 30, 1937, Serial No. 177,386

8 Claims. (Cl. 260—251)

The present invention relates to a process of producing surface-active wetting agents and the products thereof.

One object of this invention is to provide for a process of producing a wetting agent, carrying in the cation at least one group inducing surface-activity, by condensing a halogenated petroleum hydrocarbon having a chain of eight or more carbon atoms with a tertiary base selected from the group consisting of amines, phosphines, arsines and stibines under substantially anhydrous conditions, said agent being capable of furnishing ions in an ionizing medium.

Another object of this invention is to provide for a process of producing a cation-active wetting agent by condensing a halogenated paraffin wax with a tertiary base selected from the group consisting of amines, phosphines, arsines and stibines under substantially anhydrous conditions.

A further object of this invention is to provide for a process of producing a surface-active wetting agent by condensing an aliphatic, carbocyclic or heterocyclic tertiary base selected from the group consisting of amines, phosphines, arsines and stibines under substantially anhydrous conditions, said agent being capable of furnishing ions in an ionizing medium while being stable therein.

Other objects of my invention will become apparent to those skilled in the art from a study of the following specification.

I am well aware that so-called "onium" compounds have, heretofore, been prepared by condensing a tertiary base with an alkyl halide containing eight or more carbon atoms to form surface-active wetting agents, for example lauryl-trimethyl-ammonium bromide, lauryl-pyridonium sulphate, cetyl-methyl-diethyl-ammonium hydroxide, cetyl-pyridonium chloride, etc. However, it has been found in actual practice that such quaternary ammonium bases and salts are very expensive chemicals due to the difficulties involved in the production of high-molecular alcohols, such as lauryl alcohol, octyl alcohol, cetyl alcohol, etc., these alcohols being essential raw materials for the production of the aforementioned wetting agent. Furthermore, since it is necessary to convert these alcohols into alkyl halides—this conversion being expensive and resulting in poor yields—before the condensation with tertiary bases can be achieved, the production costs of such wetting agents has prevented, so far, their extended use in various chemical arts.

By experimentation, I have unexpectedly found that cation-active wetting agents may be produced by a simple and inexpensive condensation process comprising heating a halogenated petroleum constituent, having at least eight carbon atoms, at a relatively low temperature with a tertiary base selected from the group consisting of amines, phosphines, arsines, and stibines.

Petroleum consists of complex mixtures of hydrocarbons concerning the chemical nature of which there is very little information, although there are indications that all of these materials contain members of the methane series, the polymethylene series and the benzene series of hydrocarbons. The difference between petroleums of various sources resides in the proportions of the different types of hydrocarbons and in the chemical nature and amounts of their impurities. Pennsylvania oil, for example, contains a large proportion of methane hydrocarbons and practically no impurities of sulphur or nitrogen compounds. About thirty hydrocarbons have been isolated and identified with certainty. Distillation is the principal method used in separating crude petroleum into useful components. The distilled fractions from crude petroleum are casinghead gasoline, gasoline, kerosene, gas oil and lighter lubricating oils ("neutrals"). The residues from such distillation supply most of the lubricating oils ("bright stock") petrolatum (Vaseline) and either paraffin wax or petroleum pitch, depending upon the nature of the crude petroleum. Kerosene is any mixture of hydrocarbons which is not volatile enough for use as gasoline in explosion motors. Cracker gasolines are rich in olefins and diolefins. Paraffin wax was originally obtained from tars from the distillation of wood, peat, and lignite, but is now obtained from petroleum, and especially from Pennsylvania paraffin-base oils. Little information is available about the composition of paraffin waxes except that it consists mainly of higher alkanes and only small amounts of the normal compounds. Petrolatum (Vaseline) is a pasty mixture of hydrocarbons similar to paraffin while liquid petrolatum is a high boiling petroleum distillate. Ozokerite is a natural paraffin wax originating in Galicia; in bleached form it is termed "ceresin." All of these petroleum hydrocarbons may be halogenated in conventional manner in the presence or absence of catalysts to form halogenated hydrocarbon mixtures adapted to be condensed with tertiary bases in accordance with my present invention. The substances, such as petroleum hydrocarbons, to be halogenated may be first dissolved in carbon tetrachloride and subsequently chlorine, bromine, etc., in gaseous form introduced therein until the heat of reaction abates. Halogenated compounds, containing about 25 to 40% of a halogen may be obtained in this manner. However, upon prolonging the introduction of halogens, compounds may be obtained containing up to about 75% of a halogen, and it is to be noted that the boiling or fusing points of the raw materials are either lowered or raised by halogenation. Hydrochloric acid, hydrobromic acid, etc., formed during this reaction must be removed, preferablly by neutralization. Catalysts, such as iron, etc., may be added to the mixtures to accelerate halogenation. Halogenation will also proceed more rapidly by carrying out the reaction under the influence of ultra-violet rays. The halogenation may also be performed in accordance with processes disclosed, for example, in U. S. Patent #989,225 to Blakeman of April 11, 1911; U. S. Patent #1,191,916 to Brooks of July 18, 1916; U. S. Patent #1,246,810 to Ellis of November 13, 1917; U. S. Patent #1,432,761 to Koch of October 24, 1922; etc. Chlorinated paraffin, sold under the trade name of "Chlorafin" is also a suitable raw material in my process.

Tertiary bases, capable of being condensed with halogenated petroleum hydrocarbons, are for example: Trialkyl amines, amines having two aliphatic radicals and one aromatic radical (dialkyl-aryl amines), amines having one aliphatic and two aromatic radicals (alkyl-diaryl amines), triaryl amines, pyridine, substituted pyridines, pyridazine, pyrimidine, pyrazine, triazole, oxazole, tetrazole, quinoline, substituted quinolines, acridine, substituted acridines, phenanthridine, phenanthrolines, phenazine, picoline, substituted picolines, trialkyl phosphines, dialkyl-aryl phosphines, diaryl-alkyl phosphines, triaryl phosphines, trialkyl arsines, dialkyl-aryl arsines, diaryl-alkyl arsines, triaryl arsines, trialkyl stibines, dialkyl-aryl stibines, diaryl-alkyl stibines, triaryl stibines, etc. Dialkyl sulphides, diaryl sulphides and sulphides having one aliphatic and one aromatic radical directly linked to a sulphur atom may also be condensed with halogenated paraffin hydrocarbons to form cation-active sulphonium compounds suitable as wetting agents.

The tertiary bases, set forth above, have the following general structure:

in which X represents nitrogen, phosphorus, arsenic or antimony and $R_1$, $R_2$ and $R_3$ represent monovalent aliphatic or aromatic radicals directly linked to X. If X becomes part of a heterocyclic ring as exemplified by pyridine, picoline, etc., the tertiary base has the structure:

Thus, the wetting agents prepared in accordance with the present invention have probably the structures:

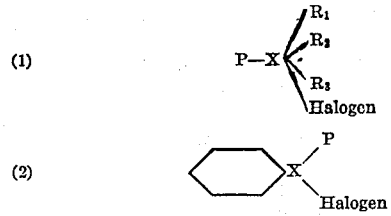

in which P represents a petroleum hydrocarbon chain having 8 or more carbon atoms, X represents nitrogen, phosphorus, arsenic or antimony and $R_1$, $R_2$ and $R_3$ represent monovalent, aliphatic or monovalent aromatic radicals directly linked to X.

*Example I*

About 150 grams of triethanolamine are heated with about 30 grams of a chlorinated paraffin (chlorafin) under reflux for about 12 hours at a temperature of about 90° C. The reaction is completed when the light yellow color of the mixture has turned to a dark, red-brown color and foaming subsides. Upon cooling the products of reaction solidify to a soft, highly viscous mass which foams in the presence of alkalis and acids without decomposition. The raw product may be purified by extraction, etc., although it may be used in an impure form for commercial purposes. The cation-activity of the product originates from a number of hydrocarbon chains having eight or more carbon atoms directly linked to nitrogen atoms of tertiary bases. The free base may be isolated from the chloride in well-known manner with moist silver oxide. Inert solvents, such as benzene, ether, chlorinated aromatic hydrocarbons, such as carbon tetrachloride, etc. may be used to dissolve the bases and halogenated petroleum hydrocarbons before these compounds are condensed. This process may be carried out with other halogenated petroleum hydrocarbons and tertiary bases.

*Example II*

About 50 grams of a chlorinated paraffin were dissolved in about 500 ml. of anhydrous pyridine and the mixture refluxed for 10 to 24 hours at a temperature of about 50° C. The light yellow solution turns dark brown during refluxing. After removing excess pyridine by distillation and cooling, a dark-brown mass is obtained which foams in the presence of alkalis, acids and salts. Tertiary phosphines, arsines and stibines may replace this tertiary amine. Other halogenated paraffin waxes and halogenated petroleum hydrocarbons may replace chlorinated paraffin. The condensation may be carried out in vacuo and in the presence of inert solvents.

Although these examples will serve to illustrate the present invention, I do not wish to be limited to the exact proportions set forth above, which are typical combinations, as certain of these compounds may be omitted or replaced by others of similar nature, and the proportions within wide limits may be varied. In other words, while I have found that halogenated petroleum hydrocarbons and tertiary bases enumerated above give the desired results, I do not wish to be limited to the use of all of these compounds, to these compounds and no others, nor to the exact proportions and concentrations, set forth above, since a considerable variation of proportions and concentrations will not adversely affect the chemical and physical characteristics of the wetting agents resulting from such variations. The condensations may be carried out at any temperature at which the condensation products are not decomposed.

These novel surface-active compounds may be used in practically all processes or for any purpose where it is desirable to employ a detergent or a compound having wetting and penetrating power. They may be used in neutral, alkaline and acidic aqueous solutions, and also in hard water, whereas many detergents are ineffective in one or more of such solutions. Silk, wool and other textile materials which are affected by alkaline solutions may be thoroughly cleansed in acidic solutions containing these novel agents. Cotton fibers and fabrics, threads and fabrics of regenerated cellulose may be cleansed with these detergents in alkaline solutions. These wetting agents may also be used in combination with other anion- or cation-active compounds, or with neutral, acid or basic salts, such as, for example, sodium sulphate, sodium chloride, disodium phosphate, sodium acetate, sodium bisulphate, and similar alkali metal and ammonium salts. They may be added to desulphurizing baths, mercerizing baths, pickling solutions, etc. They may be used as flotation agents, disinfectants, plasticizers, stripping agents for dyestuffs, agents for preventing bleeding of dyestuffs, emulsifyers, etc. These novel wetting agents may be admixed with viscose solutions and acid spin baths to prevent incrustation of the orifices of spinnerets used in the manufacture of regenerated cellulose. The term "halogenated petroleum" covers chlorinated, brominated, fluorinated and iodinated petroleums containing the constituents set forth above. Thus, a halogenated petroleum condensed in accordance with my present invention with a tertiary amine results in the formation of active and inactive quaternary ammonium, phosphonium, arsonium and stibonium halides, respectively, which need not be separated from each other, the active halides being compounds which contain at least one hydrocarbon chain having eight or more carbon atoms, and which are sufficiently soluble to furnish ions in an ionizing medium.

Modifications of my invention will readily be recognized by those skilled in the art, and I desire to include all such modifications coming within the scope of the appended claims.

I claim:

1. The process of producing a surface-active wetting agent which comprises heating a halogenated non-gaseous, aliphatic petroleum hydrocarbon with a tertiary amine below their boiling points under substantially anhydrous conditions.

2. The process of producing a surface-active wetting agent which comprises heating a halogenated non-gaseous, aliphatic petroleum hydrocarbon with a tertiary, aliphatic amine below their boiling points under substantially anhydrous conditions.

3. The process of producing a surface-active wetting agent which comprises heating a halogenated non-gaseous aliphatic petroleum hydrocarbon with a tertiary, heterocyclic amine below their boiling points under substantially anhydrous conditions.

4. A surface-active wetting agent, the heat-reaction product of a halogenated non-gaseous, aliphatic petroleum hydrocarbon and a tertiary amine.

5. A surface-active wetting agent, the heat-reaction product of a halogenated non-gaseous aliphatic petroleum hydrocarbon and a tertiary aliphatic amine.

6. A surface-active wetting agent, the heat-reaction product of a halogenated non-gaseous, aliphatic petroleum hydrocarbon and a tertiary heterocyclic amine.

7. The process of producing a surface-active wetting agent which comprises heating a halogenated, non-gaseous, aliphatic petroleum hydrocarbon with triethanolamine below their boiling points under substantially anhydrous conditions.

8. A surface-active wetting agent, the heat-reaction product of a halogenated, non-gaseous, aliphatic petroleum hydrocarbon and triethanolamine.

RUDOLPH S. BLEY.